US010098217B2

(12) United States Patent
Chen et al.

(10) Patent No.: US 10,098,217 B2
(45) Date of Patent: Oct. 9, 2018

(54) COMPOSITE CONSUMABLES FOR A PLASMA ARC TORCH

(75) Inventors: Carey Chen, Hanover, NH (US); Nicholas Sanders, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 1058 days.

(21) Appl. No.: 13/570,526

(22) Filed: Aug. 9, 2012

(65) Prior Publication Data

US 2014/0021175 A1 Jan. 23, 2014

Related U.S. Application Data

(63) Continuation-in-part of application No. 13/553,273, filed on Jul. 19, 2012.

(51) Int. Cl.
*B23K 10/00* (2006.01)
*H05H 1/34* (2006.01)

(52) U.S. Cl.
CPC ....... *H05H 1/34* (2013.01); *H05H 2001/3426* (2013.01); *H05H 2001/3442* (2013.01); *Y10T 29/49117* (2015.01)

(58) Field of Classification Search
CPC ............. H05H 1/34; H05H 2001/3426; H05H 2001/3442; Y10T 29/49117
USPC ............... 219/121.48, 121.5, 121.52, 121.53
See application file for complete search history.

(56) References Cited

U.S. PATENT DOCUMENTS 2,784,294 A 3/1954 Gravert
2,898,441 A 7/1957 Reed et al.
2,923,809 A 3/1958 Clews et al.
3,004,189 A 10/1959 Giannini
3,082,314 A 3/1963 Arata et al.
3,131,288 A 4/1964 Browning
3,198,932 A 8/1965 Weatherly
3,242,305 A 3/1966 Kane et al.
3,534,388 A 10/1970 Ito et al.
(Continued)

FOREIGN PATENT DOCUMENTS

CN 1054387 A 9/1991
CN 1083424 A 3/1994
(Continued)

OTHER PUBLICATIONS

International Search Report and Written Opinion from corresponding PCT patent application No. PCT/US2013/039640, dated Mar. 18, 2014, 13 pages.
(Continued)

*Primary Examiner* — Thien S Tran
(74) *Attorney, Agent, or Firm* — Proskauer Rose LLP

(57) ABSTRACT

An electrode is provided for use in a plasma arc torch. The electrode includes a body having a forward portion, a middle portion and an aft portion. The forward portion includes an electrode tip comprising a conductive first material, wherein the electrode tip includes: 1) a pilot contact region for initiating a pilot arc across the nozzle and 2) an emitter. The middle portion comprises a second material and defines a proximal end for mating with the forward portion and a distal end for mating with the aft portion. The material density of the second material is at least half of the material density of the first material. The electrode also includes an electrically conductive path extending from the forward portion to the aft portion of the body.

11 Claims, 7 Drawing Sheets

(56) References Cited

U.S. PATENT DOCUMENTS

| | | | | | |
|---|---|---|---|---|---|
| 3,619,549 | A | | 11/1971 | Hogan et al. | |
| 3,641,308 | A | | 2/1972 | Couch, Jr. et al. | |
| 3,676,639 | A | | 7/1972 | Esiban et al. | |
| 3,686,528 | A | * | 8/1972 | Sheets | H05H 1/48 313/146 |
| 3,787,247 | A | | 1/1974 | Couch, Jr. | |
| 3,794,806 | A | | 2/1974 | Klasson | |
| 3,833,787 | A | | 9/1974 | Couch, Jr. | |
| 3,930,139 | A | | 12/1975 | Bykhovsky et al. | |
| 4,055,741 | A | | 10/1977 | Bykhovsky et al. | |
| 4,149,052 | A | | 4/1979 | Piber | |
| 4,514,616 | A | | 4/1985 | Warner | |
| 4,562,327 | A | * | 12/1985 | Mielke | B23K 9/04 219/76.11 |
| 4,580,032 | A | | 4/1986 | Carkhuff | |
| 4,675,493 | A | | 6/1987 | Gartland et al. | |
| 4,701,590 | A | | 10/1987 | Hatch | |
| 4,781,175 | A | | 11/1988 | McGreevy et al. | |
| 4,791,266 | A | | 12/1988 | Gérard | |
| 4,791,268 | A | | 12/1988 | Sanders et al. | |
| 4,841,114 | A | | 6/1989 | Browning | |
| 4,902,871 | A | | 2/1990 | Sanders et al. | |
| 4,940,877 | A | | 7/1990 | Broberg | |
| 4,959,520 | A | | 9/1990 | Okada et al. | |
| 4,967,055 | A | | 10/1990 | Raney et al. | |
| 4,973,816 | A | | 11/1990 | Haberman | |
| 5,013,885 | A | | 5/1991 | Carkhuff et al. | |
| 5,039,837 | A | | 8/1991 | Nourbakhsh et al. | |
| 5,097,111 | A | | 3/1992 | Severance, Jr. | |
| 5,132,512 | A | | 7/1992 | Sanders et al. | |
| 5,132,513 | A | | 7/1992 | Ingwersen et al. | |
| 5,164,569 | A | | 11/1992 | Porra et al. | |
| 5,170,033 | A | | 12/1992 | Couch, Jr. et al. | |
| 5,208,441 | A | | 5/1993 | Broberg | |
| 5,216,221 | A | | 6/1993 | Carkhuff | |
| 5,223,686 | A | | 6/1993 | Benway et al. | |
| 5,260,546 | A | | 11/1993 | Ingwersen et al. | |
| 5,308,949 | A | | 5/1994 | Reed, Jr. et al. | |
| 5,310,988 | A | | 5/1994 | Couch, Jr. et al. | |
| 5,317,126 | A | | 5/1994 | Couch, Jr. et al. | |
| 5,328,516 | A | | 7/1994 | Dietiker | |
| 5,338,917 | A | | 8/1994 | Stuart et al. | |
| 5,393,952 | A | | 2/1995 | Yamaguchi et al. | |
| 5,449,206 | A | | 9/1995 | Lockwood | |
| 5,451,740 | A | | 9/1995 | Hanus et al. | |
| 5,591,356 | A | | 1/1997 | Sakuragi et al. | |
| 5,624,586 | A | | 4/1997 | Sobr et al. | |
| 5,628,924 | A | | 5/1997 | Yoshimitsu et al. | |
| 5,667,193 | A | | 9/1997 | Chrzanowski | |
| 5,683,599 | A | | 11/1997 | Ellis | |
| 5,718,863 | A | | 2/1998 | McHugh et al. | |
| 5,726,415 | A | | 3/1998 | Luo et al. | |
| 5,767,472 | A | | 6/1998 | Walters | |
| 5,767,478 | A | | 6/1998 | Walters | |
| 5,856,647 | A | | 1/1999 | Luo | |
| 5,965,040 | A | * | 10/1999 | Luo | B23K 10/00 219/121.48 |
| 5,988,103 | A | * | 11/1999 | Fetherston | C23C 14/046 118/723 E |
| 5,994,663 | A | | 11/1999 | Lu | |
| 6,020,572 | A | | 2/2000 | Marner et al. | |
| 6,078,023 | A | | 6/2000 | Jones et al. | |
| 6,096,993 | A | | 8/2000 | Marhic et al. | |
| 6,114,649 | A | | 9/2000 | Delcea | |
| 6,130,399 | A | | 10/2000 | Lu et al. | |
| 6,156,995 | A | | 12/2000 | Severance, Jr. | |
| 6,163,008 | A | | 12/2000 | Roberts et al. | |
| 6,171,099 | B1 | | 1/2001 | Lin | |
| 6,191,381 | B1 | | 2/2001 | Kabir | |
| 6,207,923 | B1 | | 3/2001 | Lindsay | |
| 6,268,583 | B1 | | 7/2001 | Yamaguchi et al. | |
| 6,350,960 | B1 | | 2/2002 | Norris | |
| 6,365,867 | B1 | | 4/2002 | Hooper | |
| 6,403,915 | B1 | | 6/2002 | Cook et al. | |
| 6,452,130 | B1 | | 9/2002 | Qian et al. | |
| 6,486,430 | B2 | | 11/2002 | Naor | |
| 6,492,037 | B2 | | 12/2002 | Shindo et al. | |
| 6,677,550 | B2 | | 1/2004 | Förnsel et al. | |
| 6,677,551 | B2 | | 1/2004 | Hardwick | |
| 6,683,273 | B2 | | 1/2004 | Conway et al. | |
| 6,686,559 | B1 | | 2/2004 | Walters | |
| 6,689,983 | B2 | | 2/2004 | Horner-Richardson et al. | |
| 6,700,091 | B2 | | 3/2004 | Jones et al. | |
| 6,713,711 | B2 | | 3/2004 | Conway et al. | |
| 6,841,754 | B2 | | 1/2005 | Cook et al. | |
| 6,903,301 | B2 | | 6/2005 | Jones et al. | |
| 6,987,238 | B2 | | 1/2006 | Horner-Richardson et al. | |
| 7,244,909 | B2 | | 7/2007 | Kensrue et al. | |
| 7,429,715 | B2 | | 9/2008 | Mackenzie et al. | |
| 7,598,473 | B2 | | 10/2009 | Cook et al. | |
| 7,659,488 | B2 | | 2/2010 | Cook et al. | |
| 7,820,935 | B2 | * | 10/2010 | Tverskoi | H05H 1/34 219/121.39 |
| 7,829,816 | B2 | | 11/2010 | Duan et al. | |
| 8,395,076 | B2 | | 3/2013 | Matus | |
| 8,552,341 | B2 | | 10/2013 | Zamuner | |
| 8,624,150 | B2 | | 1/2014 | Simek et al. | |
| 8,772,673 | B2 | | 7/2014 | Kachline | |
| 2002/0125224 | A1 | * | 9/2002 | Cook | H05H 1/34 219/121.48 |
| 2003/0052095 | A1 | | 3/2003 | Sanders et al. | |
| 2003/0091383 | A1 | | 5/2003 | Conway | |
| 2003/0160032 | A1 | | 8/2003 | Mackenzie et al. | |
| 2005/0061784 | A1 | | 3/2005 | Matus | |
| 2005/0109736 | A1 | * | 5/2005 | Matus | B23K 10/00 219/121.5 |
| 2005/0258150 | A1 | | 11/2005 | Hewett et al. | |
| 2006/0049150 | A1 | | 3/2006 | Severance, Jr. | |
| 2006/0289396 | A1 | | 12/2006 | Duan | |
| 2006/0289398 | A1 | | 12/2006 | Cook et al. | |
| 2007/0082532 | A1 | | 4/2007 | Morris | |
| 2007/0090168 | A1 | | 4/2007 | Snow et al. | |
| 2007/0262060 | A1 | | 11/2007 | Roberts et al. | |
| 2008/0173622 | A1 | | 7/2008 | Lindsay et al. | |
| 2008/0210669 | A1 | | 9/2008 | Yang et al. | |
| 2008/0217305 | A1 | | 9/2008 | Sanders | |
| 2009/0039059 | A1 | | 2/2009 | Twarog et al. | |
| 2010/0078408 | A1 | | 4/2010 | Liebold et al. | |
| 2010/0237050 | A1 | | 9/2010 | Zehavi | |
| 2010/0294744 | A1 | | 11/2010 | Hewett et al. | |
| 2011/0042357 | A1 | | 2/2011 | Griffin | |
| 2012/0031881 | A1 | | 2/2012 | Griffin | |
| 2012/0055906 | A1 | | 3/2012 | Shipulski et al. | |
| 2012/0145680 | A1 | | 6/2012 | Warren, Jr. et al. | |
| 2012/0292296 | A1 | | 11/2012 | Griffin | |
| 2014/0263254 | A1 | | 9/2014 | Enyedy et al. | |

FOREIGN PATENT DOCUMENTS

| | | | |
|---|---|---|---|
| CN | 101554099 | A | 10/2009 |
| CN | 101884253 | A | 11/2010 |
| CN | 102577630 | A | 7/2012 |
| DE | 3714995 | | 11/1988 |
| EP | 0079019 | | 5/1983 |
| EP | 0157702 | | 10/1985 |
| EP | 0159256 | | 10/1985 |
| EP | 0208134 | | 6/1986 |
| EP | 0437915 | | 7/1991 |
| EP | 0529850 | | 3/1993 |
| EP | 1147692 | | 10/2001 |
| EP | 1202614 | | 5/2002 |
| EP | 2255916 | | 12/2010 |
| FR | 2044232 | | 2/1971 |
| GB | 1008687 | | 11/1965 |
| GB | 2365810 | | 2/2002 |
| JP | 01212674 | | 8/1989 |
| JP | 01232475 | | 9/1989 |
| WO | 00/02697 | | 1/2000 |
| WO | 00/39485 | | 7/2000 |
| WO | 01/66298 | | 9/2001 |
| WO | 2001076328 | A2 | 10/2001 |
| WO | 03024655 | | 3/2003 |

(56) References Cited

FOREIGN PATENT DOCUMENTS

| | | | |
|---|---|---|---|
| WO | 03089183 | A1 | 10/2003 |
| WO | 2008/033905 | | 3/2008 |
| WO | 2015172140 | A1 | 11/2015 |

OTHER PUBLICATIONS

Inner Logic® SR-45; Consumables, http://www.attcusa.com/plasma/InnerLogicSR-45i.php.

Lincoln® Procut 20, 55, 80 Consumables, http://www.attcusa.com/plasma/LincolnProcut20-55-80.php.

Hypertherm MAX 40cs/42/43 Brochure, PAC120/121TS/125T Consumables, Aug. 11, 2006, http://www.hypertherm.com/languages/english/PDF/TB_MAX40cs,42,43_oldrev.pdf.

Hypertherm HD-1070 HyDefinition® Torch Parts, May 1995, 4 pages.

ESAB Welding and Cutting Products Catalog, Apr. 1995, 17 Pages.

International Search Report and Written Opinion for corresponding PCT application PCT/US2015/052906, dated Jan. 7, 2016, 14 pages.

First Office Action with a Search Report completed by the Examiner on Feb. 3, 2016 for PRC (China) Patent Application No. 201380046606.2, dated Feb. 16, 2016.

Loc-Line image retrieved from the internet via http://www.loc-line.com/_doc/Loc-Line%20Catalog%202012.pdf, 2015, 1 page.

Loc-line catalog retrieved from the internet via http://www.bing.com/images/search?q=locline&FORM=HDRSC2#view=detail&id=A9C1E7C02591DE5B4B70CC3D94CA70E25EEFC31C&selectedIndex=25, 2015, 24.

Hypertherm Image of Hardware Parts—Press on shield PN 120934.

* cited by examiner

COMPOSITE CONSUMABLES FOR A PLASMA ARC TORCH

CROSS REFERENCE TO RELATED APPLICATIONS

This application is a continuation-in-part of U.S. Ser. No. 13/553,273, filed Jul. 19, 2012 and titled "Composite Consumable for a Plasma Arc Torch," which is owned by the assignee of the instant application and the entirety of which is incorporated herein by reference.

FIELD OF THE INVENTION

The present invention relates generally to composite consumables for plasma arc torches, and more particularly, to composite consumables including a conductive first material and at least one additional material having a lower material density than the conductive first material.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). A swirl ring can be employed to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal.

Consumables for plasma arc torches are commonly made of copper. While copper provides good heat transfer characteristics, it is becoming increasingly expensive and thus not cost effective to use. In addition, certain new designs of consumables, including consumables with elongated dimensions, require an increasing amount of copper to achieve their intended benefits. Therefore, it would be desirable to reduce the amount of copper used in consumables without comprising consumable functionality.

SUMMARY OF THE INVENTION

It is an objective of the present invention to provide at least one composite consumable that combines the material property benefits of a conductive material, such as copper, with the cost benefits of one or more cheaper materials. Another objective of the present invention is to provide methods for manufacturing composite consumables to further reduce cost and machine time. Yet another objective of the invention is to reduce the weight of one or more consumables, thereby reducing the weight of a plasma arc torch after the consumables are installed therein. A lower torch weight enhances the torch's maneuverability and reduces potential user fatigue in manual torch operations.

In one aspect, an electrode for use in a plasma arc torch is provided. The electrode is disposed relative to a nozzle to form a plasma chamber. The electrode includes a body having a forward portion, a middle portion and an aft portion. The forward portion includes an electrode tip comprising a conductive first material. The electrode tip includes: 1) a pilot contact region for initiating a pilot arc across the nozzle and 2) an emitter. The middle portion includes a second material. The middle portion defines a proximal end for mating with the forward portion and a distal end for mating with the aft portion. In addition, the material density of the second material is at least half of the material density of the first material. The electrode also includes an electrically conductive path extending from the forward portion to the aft portion of the body.

The first material can include copper or silver. The second material can include at least one of aluminum, brass, nickel, or stainless steel. In some embodiments, the first material is copper and the second material is aluminum. The aft portion can include a third material, which can be substantially non-conductive. In some embodiments, the aft portion includes the second material.

In some embodiments, the density of the first material is at least three times greater than the density of the second material. In some embodiments, the density of the third material is less than the density of at least the first material or second material. In some embodiments, the length of the forward portion is about 25% of the length of the electrode.

In some embodiments, the forward portion is press fit into the proximal end of the middle portion. The aft portion can be press fit into a distal end of the middle portion. In some embodiments, a mating surface of the forward portion and a first mating surface of the middle portion are in direct contact with each other and form a hermetic seal. The mating surface of the forward portion or the first mating surface of the middle portion can be non-planar. In some embodiments, a mating surface of the aft portion and a second mating surface of the middle portion are in direct contact with each other and form a hermetic seal. The mating surface of the aft portion or the second mating surface of the middle portion can be non-planar.

In some embodiments, the forward portion, the aft portion and the middle portion are manufactured as separate pieces.

In some embodiments, the electrode tip is cooled by a flow of a pressurized gas external to the electrode. The aft portion can include a pneumatic reaction region for receiving a biasing flow of the pressurized gas.

In some embodiments, the plasma arc torch is a contact start plasma arc torch.

In another aspect, an electrode for use in a plasma arc torch is provided. The electrode includes an elongated forward portion including a proximal end and a distal end. The forward portion provides an electrically conductive path from the distal end to the proximal end. In addition, the forward portion includes a first conductive material with a first density. The electrode also includes a ring-shaped aft portion defining a hollow center. The ring-shaped aft portion is configured to substantially surround a portion of the forward portion when the forward portion is located inside of the hollow center of the ring-shaped aft portion. The aft portion includes a second conductive material with a second density. The second density is at least two times less than the density of the first material. The electrode further includes an emitter disposed in the proximal end of the forward portion.

In some embodiments, the ring-shaped aft portion includes a pneumatic reaction region for receiving a biasing flow of a pressurized gas. The ring-shaped aft portion can include at least one fluid passageway for allowing passage of a gas therethrough.

In some embodiments, the electrode further includes a contact element located at the distal end of the forward portion and a resilient element located between the contact element and the ring-shaped aft portion while physically contacting the forward portion. The resilient element is configured for biasing the ring-shaped aft portion and the forward portion away from the contact element. The contact element can be made from a third material. During a pilot arc operation of the plasma arc torch, the resilient element can pass substantially all of a pilot arc current between a power supply and the forward portion via the contact element. During a transferred arc operation of the plasma arc torch, the resilient element can pass at least a portion of a transferred arc current between a power supply and the forward portion via the contact element.

In some embodiments, the first conductive material comprises copper and the second conductive material comprises aluminum.

In another aspect, a nozzle for use in a plasma arc torch is provided. The nozzle includes an aft portion comprising a conductive first material with a first density. The aft portion defines a proximal end and a distal end. The nozzle also includes a substantially hollow forward portion including: 1) a tip section comprising a conductive second material with a second density, and 2) a rear section configured to couple the forward portion to the proximal end of the aft portion. The second density is at least two times greater than the first density. The nozzle further includes a plasma exit orifice disposed in the tip section of the forward portion.

In some embodiments, the tip section of the forward portion includes an exterior portion of the nozzle and forms a nozzle tip. In addition, the rear section of the forward portion can include an interior portion of the nozzle and forms at least a section of a plasma chamber in cooperation with an electrode disposed in the plasma arc torch. Furthermore, the nozzle can include at least one venting channel embedded in at least one of the aft portion or the forward portion for venting at least a portion of a plasma gas away from the plasma chamber.

In some embodiments, the conductive first material comprises aluminum. In some embodiments, the conductive second material comprises copper. In some embodiments, the rear section of the forward portion comprises the first material or the second material.

In some embodiments, a mating surface of the tip section of the forward portion and a mating surface of the aft portion are in direct contact with each other and form a hermetic seal.

In some embodiments, the nozzle further includes an exterior portion substantially overlaying an exterior surface of at least one of the aft portion or the forward portion. The exterior portion can include a third material, such as an anodized layer to provide electrical insulation or corrosion resistance. In some embodiments, the third material of the exterior portion is substantially non-conductive. The density of the third material can be less than the density of at least one of the first material or the second material.

In some embodiments, the forward portion, the aft portion and the exterior portion are manufactured as separate pieces.

In yet another aspect, a nozzle for use in a plasma arc torch is provided. The nozzle includes a substantially hollow forward portion comprising copper. The forward portion includes 1) an inside portion forming at least a section of a plasma chamber, 2) an outside portion forming a nozzle tip and 3) a plasma exit orifice. The nozzle also includes an aft portion for coupling the nozzle to the plasma torch. The aft portion is formed of a material having a density less than half the density of copper. In some embodiments, the material of the aft portion is aluminum.

In some embodiments, the nozzle further includes an exterior portion substantially overlaying an exterior surface of at least one of the aft portion or the forward portion. The exterior portion includes an anodized layer.

In yet another aspect, a plasma arc torch is provided. The torch includes an electrode comprising at least a forward portion and an aft portion. The forward portion includes an electrode tip comprising a conductive first material. The electrode tip includes 1) a pilot contact region for initiating a pilot arc and 2) an emitter. The aft portion of the electrode comprises a second material. The material density of the second material is at least half of the material density of the conductive first material. The torch also includes a nozzle mounted relative to the electrode. The nozzle and the electrode define a plasma chamber.

In some embodiments, the electrode tip can be cooled by a plasma flow through the plasma chamber.

In some embodiments, the electrode further includes a third portion coupled to a distal end of the aft portion. The third portion includes a pneumatic reaction region for receiving a plasma flow.

In some embodiments, the nozzle includes at least a tip portion and a body portion. The tip portion includes the conductive first material and the body portion comprising the second material.

In yet another aspect, a method of manufacturing an electrode usable in a plasma arc torch is provided. The method includes selecting a first conductive material having a first density and a second conductive material having a second density. The second density is at least two times greater than the density of first material. The method includes forming an elongated aft portion from the first conductive material. The elongated aft portion defines a proximal end and a distal end. The method also includes forming an elongated forward portion from the second conductive material such that the elongated forward portion is coupled to the proximal end of the aft portion. The method further includes locating an emitter in the forward portion.

In some embodiments, the method further includes selecting a third material having a third density and forming a third portion from the third material such that the third portion is coupled to the distal end of the aft portion. The third portion includes a pneumatic reaction region for receiving a biasing flow of a pressurized gas.

In yet another aspect, a method of manufacturing an electrode usable in a plasma arc torch is provided. The method includes selecting a first conductive material having a first density and a second conductive material having a second density. The second density is at least two times greater than the density of first material. The method includes forming a ring-shaped aft portion from the first conductive material, the ring-shaped aft portion defining a hollow center. The method also includes forming an elongated forward portion from the second conductive material, the elongated forward portion defining a proximal end and a distal end. The method further includes fitting the elongated forward portion through the hollow center of the ring-shaped aft portion such that the ring-shaped aft portion substantially surrounds at least a portion of the forward portion. Furthermore, the method includes locating an emitter in the proximal end of the forward portion.

In some embodiments, the method of manufacturing further includes locating a contact element at the distal end of the forward portion and locating a resilient element between the contact element and the ring-shaped aft portion while the resilient element physically contacts the forward portion.

In yet another aspect, a method of manufacturing a nozzle usable in a plasma arc torch is provided. The method includes selecting a first conductive material having a first density and a second conductive material having a second density. The second density is at least two times greater than the first density. The method includes forming an aft portion from the first conductive material. The aft portion defines a proximal end and a distal end. The method also includes forming a substantially hollow forward portion including: 1) a tip section from the second conductive material, and 2) a rear section configured to couple the forward portion to the proximal end of the aft portion. The method further includes locating a plasma exit orifice in the tip section of the forward portion.

In some embodiments, the method additionally includes selecting a third material having a third density and forming an exterior portion of the nozzle from the third material. The exterior portion substantially overlays an exterior surface of at least one of the aft portion or the forward portion.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
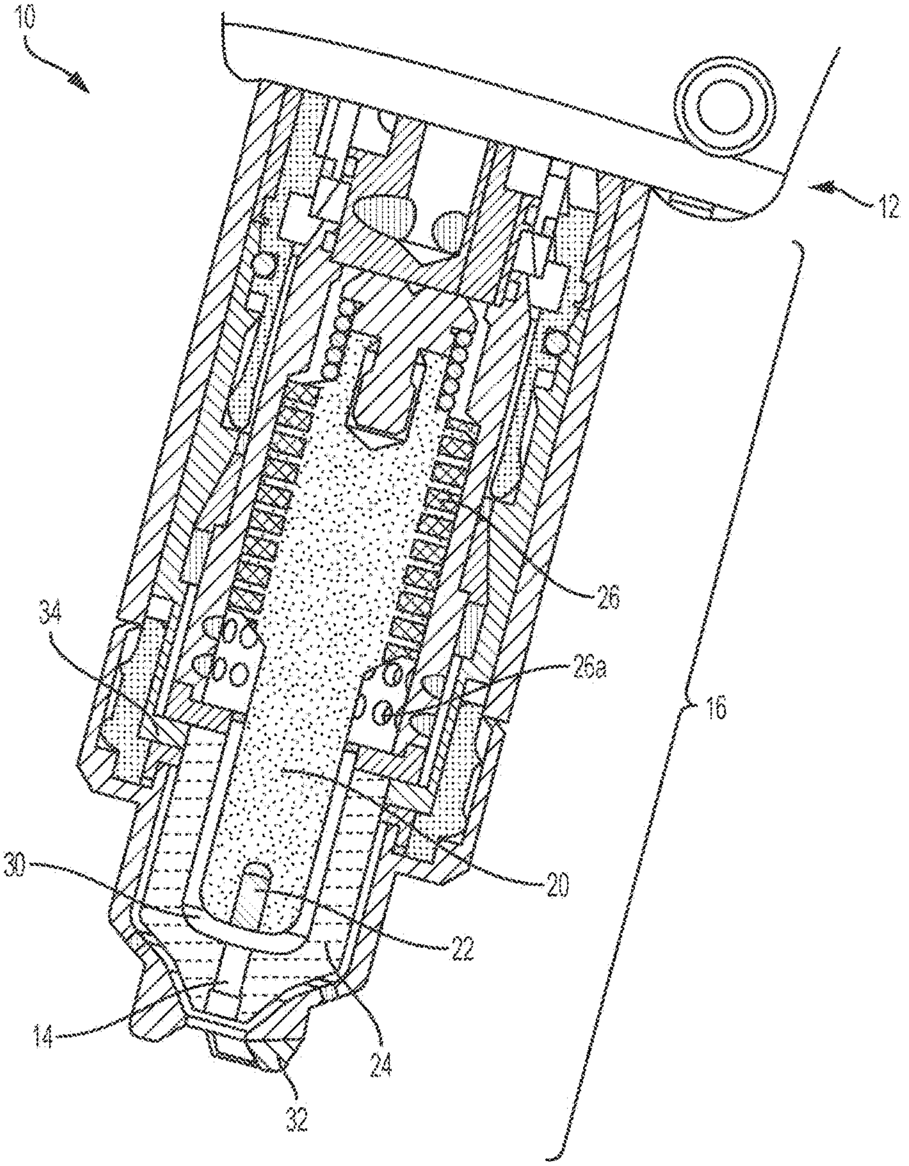
FIG. 1 shows an exemplary plasma arc torch of the present invention.

FIG. 1 shows an exemplary plasma arc torch 10 of the present invention. The torch 10 has a body 12, which is typically cylindrical with an exit orifice 14. A plasma arc, such as an ionized gas jet, passes through the exit orifice 14 and is positioned relative to a workpiece (not shown) to be cut. In a transferred arc mode, the torch 10 can pierce, cut or mark the workpiece, which can be made of a metal or another material.

The torch body 12 supports an electrode 20. An emissive insert 22 (i.e., emitter) can be disposed in the lower end of the electrode 20 so that an emission surface is exposed. The insert 22 can be made of hafnium or other materials that possess suitable physical characteristics, including corrosion resistance and a high thermionic emissivity. The torch body 12 also supports a nozzle 24, which is spaced from the electrode 20 and defines, in relation to the electrode 20, a plasma chamber 30. The nozzle 24 includes a central orifice defining the exit orifice 14. In some embodiments, a swirl ring 26 mounted to the torch body 12 has a set of radially offset (or canted) gas distribution holes 26*a* that impart a tangential velocity component to the plasma gas flow, causing the gas flow to swirl. This swirl creates a vortex that constricts the arc and stabilizes the position of the arc on the insert 22. In some embodiments, the torch body 12 supports a shield 32 connected (e.g., threaded) to a retaining cap 34. The retaining cap 34 as shown is an inner retaining cap securely connected to the nozzle 24. In some embodiments, an outer retaining cap (not shown) is secured relative to the shield 32.

A plasma arc in the plasma arc torch 10 can be generated using a contact start method. The contact start method involves establishing physical contact and electrical communication between the electrode 20 and the nozzle 24 to create a current path between them. To do so, an electrical current is provided to the electrode 20 and the nozzle 24 by a power supply (not shown), and a gas is introduced to the plasma chamber 30. Gas pressure builds up in the plasma chamber 30 until the pressure is sufficient to separate the electrode 20 and the nozzle 24. The separation causes an arc to be formed between the electrode 20 and the nozzle 24 in the plasma chamber 30. The arc ionizes the introduced gas to produce a plasma jet that can be transferred to the workpiece for material processing. In some applications, the power supply, in electrical communication with a power contact (not shown), is adapted to provide a first electrical current known as a pilot current during generation of the arc and a second current known as a transferred arc current when the plasma jet has been transferred to the workpiece.

Various configurations are possible for generating the arc by the contact start method. For example, the electrode 20 can move within the torch body 12 away from the nozzle 24, which is stationary. Such a configuration is referred to as the "blow-back" contact start method because the gas pressure causes the electrode 20 to move away from the workpiece. In another configuration, the nozzle 24 can move away from the relatively stationary electrode 20. Such a configuration is referred to as the "blow-forward" contact start method because the gas pressure causes the nozzle 24 to move toward the workpiece. In still another configuration, other torch components (e.g., the swirl ring 26) can be moved between the stationary electrode 20 and nozzle 24.

Electrodes, such as the electrode 20 of the plasma arc torch 10, have been commonly manufactured from cooper due to its good heat transfer capabilities. However, as the price of copper increases, a composite electrode in accordance with the invention was developed to reduce cost while maintaining comparable functions as an all-copper electrode or as an electrode consisting entirely of a highly conductive material.

Figure 2A:
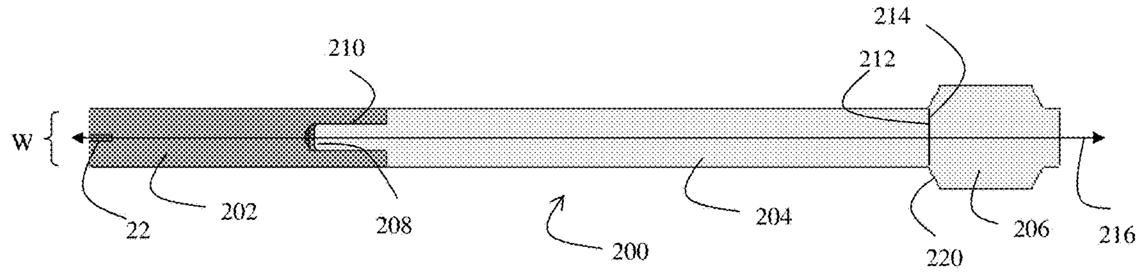
FIGS. 2A and 2B show various views of an exemplary composite electrode of the present invention.
Figure 2B:
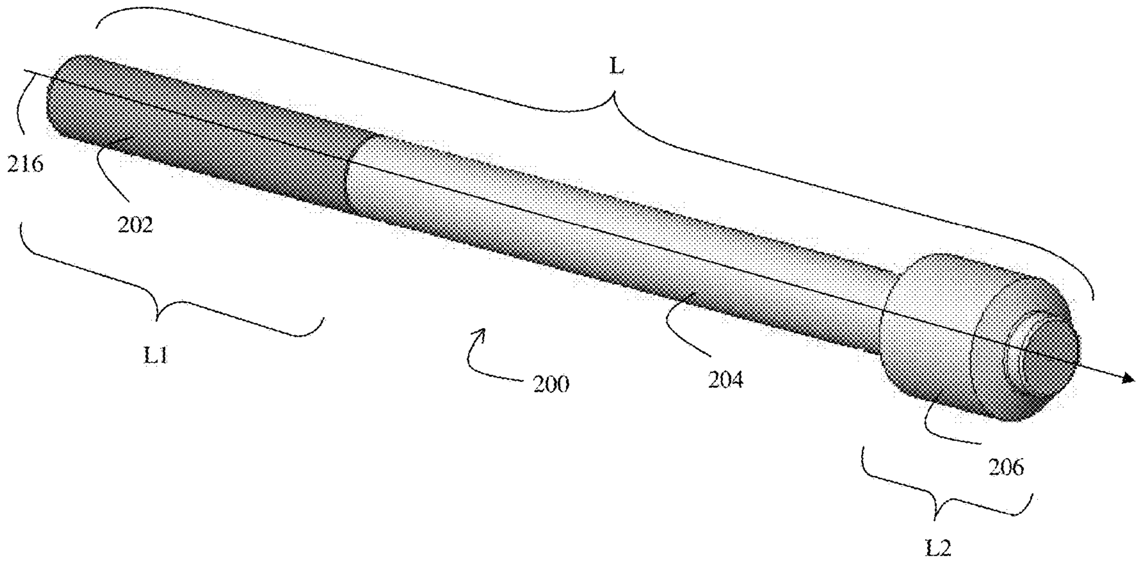

FIG. 2A shows an exemplary composite electrode 200 of the present invention. FIG. 2B shows another view of the composite electrode 200. The composite electrode 200 includes a forward portion 202 coupled to a middle portion 204, which is in turn coupled to an aft portion 206. An insert 22 is disposed in a bore formed in the forward portion 202. The forward portion 202, which is most exposed to high temperatures during torch operation, can be made of a highly conductive material, such as copper or silver. Such a material in the forward portion 202 can provide excellent heat transfer around the emissive insert 22 to achieve optimized performance and service life. A highly conductive material, however, is expensive. To reduce cost, the highly conductive material can be used only in the forward portion 202 that experiences the most amount of heat during torch operation.

Areas of the electrode 200 that are less exposed to high temperatures or exposed to lower temperatures in comparison to the forward portion 202 (e.g., the middle portion 204 and/or the aft portion 206) can be manufactured from cheaper, less thermally conductive material(s) that still provide good heat transfer properties. The composite electrode 200 can therefore approximate the functions of an electrode made from a more expensive material. In general, there is a correlation between material conductivity and material density. For example, for some materials, a lower conductivity means a lower material density. Therefore, selection of materials for different sections of the electrode 200 can be based on material density or conductivity, or a combination of both properties.

In some embodiments, the forward portion 202 is manufactured from a conductive first material, such as copper, silver or a combination thereof. In some embodiments, the middle portion 204 is manufactured from a second material that has a lower material density than the first material of the forward portion 202. The second material can include aluminum, brass nickel, stainless steel, or a combination thereof. In some embodiments, the aft portion 206 is manufactured from a third material. The third material can be different from the first material of the forward portion 202 and/or the second material of the middle portion 204. The third material can have a material density that is less than the first or second material. The third material can be substantially non-conductive, such as plastic. In some embodiments, the third material is the same as the second material of the middle portion 204, but is different from the first material of the forward portion 202. In some embodiments, the first material density of the forward portion 202 is at least two times greater than that of the middle portion 204 and/or the aft portion 206. This factor can be three times, four times or higher in other embodiments. Similarly, the second material density of the middle portion 204 can be at least two times, three times or four times greater than that of the aft portion 206.

The forward, middle and aft portions of the composite electrode 200 can be made from various combinations of materials. In one exemplary configuration of the electrode 200, the forward, middle and aft portions include copper, aluminum and plastic, respectively. In another exemplary configuration, the forward, middle and aft portions include copper, aluminum and aluminum, respectively. In some embodiments, the density of the forward portion 202 is greater than or equal to about 8 g/cm$^3$, such as 8.96 g/cm$^3$ for copper or 10.49 g/cm$^3$ for silver. In some embodiments, the density of the middle portion and/or the aft portion 206 is less than about 3 g/cm$^3$, such as 2.7 g/cm$^3$ for aluminum.

In some embodiments, the thermal conductivity of the forward portion 202 of the electrode 200 is greater than that of the middle portion 204 and/or the aft portion 206. The thermal conductivity of the middle portion 204 can also be greater than or equal to that of the aft portion 206. In some embodiments, the thermal diffusivity of the forward portion 202 of the electrode 200 is greater than that of the middle portion 204 and/or the aft portion 206. The thermal diffusivity of the middle portion 204 can also be greater than or equal to that of the aft portion 206. Generally, any material, including alloys, with physical properties such as those listed above, can be suitable for use with the invention and is contemplated to be within the scope of the invention.

As shown, the electrode 200 defines a longitudinal axis 216. The electrode 200 has a length L along the longitudinal axis 216 and a width W along the end face closest to the insert 22. In some embodiments, the length of the forward portion $L_1$ along the longitudinal axis 216 is about 25% of the overall length L of the electrode 200. Alternatively, the length of the forward portion $L_1$ comprises about 10%, 20%, 30% or 40% of the overall length L of the electrode 200. In some embodiments, the length of the aft portion $L_2$ comprises about 10%, 20%, or 30% of the overall length L of the electrode 200. In some embodiments, the electrode 202 is elongated and is configured for installation in a plasma arc torch that is capable of reaching into hard-to-access areas (e.g., channels or corners). In such cases, the ratio of the length L to width W ratio of the electrode is greater than 3, such as about 4, 5, 6, 7, 8, 9, 10, 11, 12, 13, 14, 15, 16, 17, 18, 19 or 20. Because the entire length L of the electrode 200 can be elongated, at least one of the forward portion 202, the middle portion 204 and the aft portion 206 is elongated.

Various methods can be used to join the forward portion 202 of the electrode 200 with the middle portion 204 and join the middle portion 204 with the aft portion 206. Specifically, the middle portion 204 has a first mating surface 208 that is joined with a mating surface 210 of the forward portion 202. A combination of the mating surfaces 208 and 210 results in a joint. The middle portion 204 also has a second mating surface 212 that is joined with a mating surface 214 of the aft portion 206. A combination of the mating surfaces 212 and 214 results in another joint. The mating surfaces can be planar or non-planar. The term non-planar includes any contour or shape.

Methods for joining any two mating surfaces include press fit, soft-solder, vacuum brazing, torch brazing, threading, adhesive, ultrasonic, weld, snap fit, etc. For example, a snap-fit method can be used to join the aft portion 206 (e.g., formed from plastic) to a corresponding mating surface of the middle portion 204. In some embodiments, a hermetic seal between the portions are formed to ensure that the joint pieces withstand torque during assembly, high pressure cooling during operation, heat stress, thermal expansion, thermal contraction, shear stress, thermal fatigue, etc. The method used for joining the forward and middle portions do not need to be the same as the method used for joining the middle and aft portions. As an example, while the forward portion 202 and the middle portion 204 can be joined by press fit, the middle portion 204 and the aft portion 206 can be joined by threading.

In some embodiments, two portion are join directly (i.e., without the use of any additional material), such as using a direct welding technique that results in the two portions being in direct contact with each other. An exemplary direct welding technique is friction welding, which is widely used to weld dissimilar materials and minimize cost per part. Friction welding is an ideal process for joining dissimilar metals and provides high reliability, low porosity, and excellent strength. Friction welding is also an ideal process for forming a high strength, leak-proof weld between metals with dissimilar densities (e.g., copper and aluminum), resulting in a hermetic seal. In addition, friction welding does not require the use of an additional material (e.g. solder). Friction welding, inertia friction welding, and direct drive friction welding techniques, are performed, for example, by MTI Welding of South Bend, Ind., and are described on their web site. See, for example, http://www.mtiwelding.com. Pages found at this web site describe various suitable welding techniques, and some of the associated metal combinations on which they can be used.

More particularly, these web pages describe friction welding techniques, including inertia friction welding and direct drive friction welding. These techniques can be used to create a joint between dissimilar materials that are of forged quality, and can be used to create a 100% butt joint weld throughout the contact area of the two pieces being joined. These and other direct welding techniques, including CD percussive welding, percussive welding, ultrasonic welding, explosion welding, and others, utilize combinations of workpiece acceleration and deceleration, welding speed, frictional forces, forge forces, and other such physical forces, sometimes in combination with electricity at various voltages and current flows, to create and use force and/or heat in a predetermined and controlled manner, between the workpieces being joined, to create a strong, leak-proof joint without the introduction of extraneous materials (such as flux, solder, braze, or filler materials). They accomplish this utilizing rapid and efficient cycle times, and with minimal loss of the working materials. These techniques are all considered to be within the scope of the invention.

Generally, direct welding techniques, and friction welding techniques in particular, can be employed to join electrode portions of the following materials, or alloys: silver, copper, aluminum, aluminum alloys, brass, bronze, carbides cemented, cast iron, ceramic, cobalt, columbium, copper, copper nickel, iron sintered, lead, magnesium, magnesium alloys, molybdenum, monel, nickel, nickel alloys, nimonic, niobium, niobium alloys, silver, silver alloys, steel alloys, steel-carbon, steel-free machining, steel-maraging, steel-sintered, steel-stainless, steel-tool, tantalum, thorium, titanium, titanium alloys, tungsten, tungsten carbide cemented, uranium, vanadium, valve materials (automotive), and zirconium alloys. Proper use of these techniques results in the significant electrode performance enhancements of the invention, as contrasted, for example, with conventional brazing, soldering, and other joining methods.

The composite electrode 200 can be configured to operate in the plasma arc torch 10 of FIG. 1 in place of the electrode 21. In addition, the composite electrode 200 can be configured to enable the "blow-back" contact start method for generating a plasma arc inside of the torch 10. For example, as a gas flows into the torch 10, gas pressure increases in the plasma chamber 30, thereby exerting a force on the aft portion 206 of the electrode 200 to move the electrode away from the nozzle 24. As a result of the break in electrical contact between the electrode 200 and the nozzle 24, a pilot arc is generated between the electrode 200 (which serves as the cathode) and the nozzle (which serves as the anode). The electrode 200 is adapted to maintain electrical communication with a power supply, which generates the required current for pilot arc initiation. The electrode 200 thus includes an electrically conductive path extending from the aft portion 206 to the forward portion 202 for initiating the plasma arc. In the cases where the aft portion 206 is made of a non-conductive material (e.g., plastic), a conductive element, such as a wire, can connect the power supply to the middle portion 204 or the forward portion 202 of the electrode 200 to establish an electrically conductive path. In some embodiments, the forward portion 202 includes a pilot contact region for initiating the pilot arc. The pilot contact region can be located at the tip of the electrode 200 when in direct contact with the inside of the nozzle 24. In some embodiments, the aft portion 206 includes a pneumatic reaction region 220 for receiving a biasing flow of the pressured gas that separates the electrode 200 from the nozzle 24 during pilot arc initiation.

To cool the electrode 200 during operation of the torch 10, a cooling path can be introduced in the torch 10 so that substantially all of the cooling occurs at the forward portion 202 of the electrode 200. For example, a cooling gas, such as air, can flow between the electrode 200 and the nozzle 24, passing through the swirl ring 26 and flowing through the plasma chamber 30 and out from the exit orifice 14 of the nozzle 24. In some embodiments, substantially all of the cooling gas exits through the front of the plasma arc torch and almost no cooling gas is allowed to flow back into the torch 10. However, the pressure in the plasma chamber 30 can still blow back the electrode 200 to a cutting position. This forward-flow cooling design cools the electrode 200 at the location where the majority of the heat of the plasma arc torch 10 is generated, which is at the forward portion 202. In an exemplary test conducted on a composite electrode with the forward-flow cooling feature, results demonstrate that the composite electrode can withstand about 200 starts at a 45-amp current. This is comparable to the number of starts achievable by an all-copper electrode.

There are other methods for cooling the electrode 200 once it is installed in the plasma arc torch 10. For example, a cooling tube (not shown) can be disposed in a hollow interior of the electrode 200 along the longitudinal axis 216. The tube can circulate a flow of coolant, such as water, along the interior surface of the electrode 200 to cool the electrode 200. Cavities or lumens can also be strategically located within the forward, middle and/or aft options to enhance cooling capabilities and reduce the quantity of material required for fabrication.

Figure 3A:
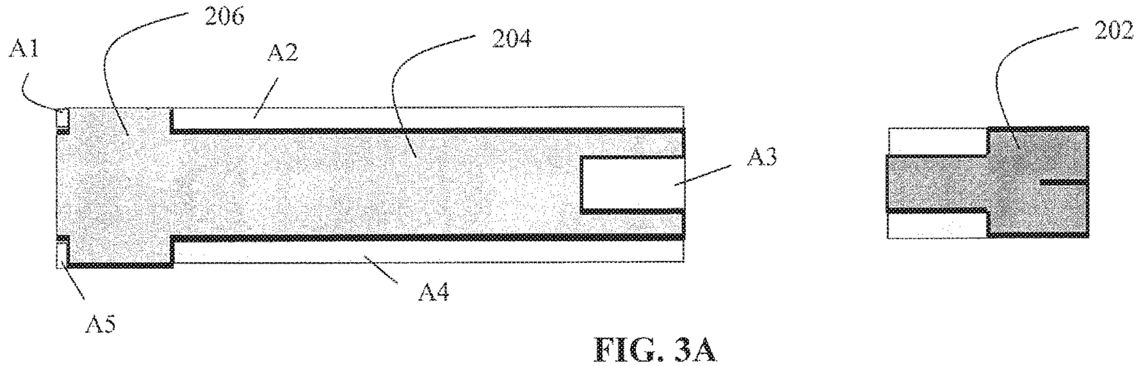
FIGS. 3A and 3B show a high-scrap approach and low-scrap approach, respectively, for manufacturing the composite electrode of FIGS. 2A and 2B.
Figure 3B:
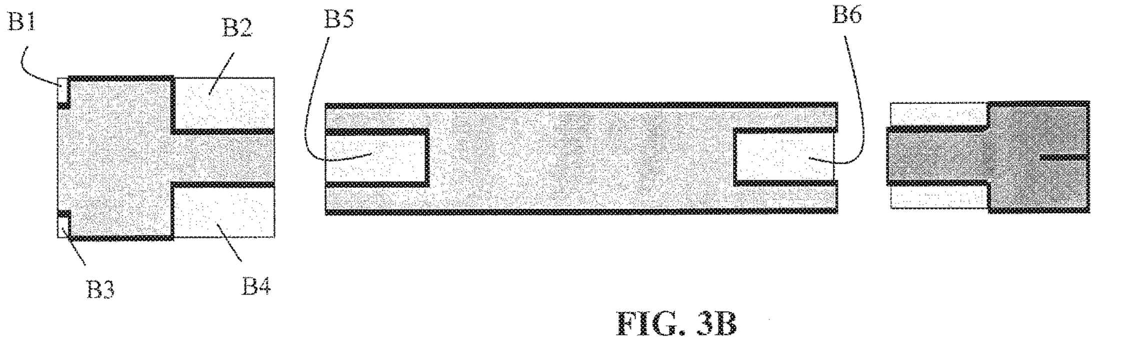

To further reduce cost associated with consumables, one or more approaches can be used to reduce scrap and machine time for manufacturing the consumables, specifically composite consumables, such as the composite electrode 200 of FIG. 2. FIG. 3A shows a high-scrap approach for manufacturing the electrode 200. FIG. 3B shows a low-scrap approach for manufacturing the same electrode 200. Assuming that the aft portion 206 and the middle portion 204 consist of the same material, under the traditional approach illustrated in FIG. 3A, one piece of bar stock is used to manufacture the two portions as a single component. Hence, the resulting scrape areas A1, A2, A3, A4 and A5 need to be machined away from the single bar stock to produce the required dimensions. In contrast, according to the approach illustrated in FIG. 3B, the aft portion 206 and the middle portion 204 are manufactured as separate pieces from two distinct pieces of bar stocks with the same material properties. As a result, scrape areas B1, B2, B3, B4, B5 and B6 are produced. In general, the scrapes B2, B4 and B5 produced from the manufacturing method of FIG. 3B are considerably less than the scrapes A2 and A4 produced from the manufacturing method of FIG. 3A, especially when the electrode 200 is elongated. This also means that less machining is required to shave the scrapes from the bar stocks in the manufacturing method of FIG. 3B. The higher scrape and machining cost associated with the method of FIG. 3A in comparison to the method of FIG. 3B is due to the irregular shape of the aft portion 206, which protrudes from the generally cylindrical profile of the electrode 200. Therefore, each irregularly shaped portion of a consumable can be manufactured from a different and/or optimal bar stock piece to produce a separate segment. In addition, the separate segments of an electrode can be joined together using one or more of the joining techniques described above.

Figure 4A:
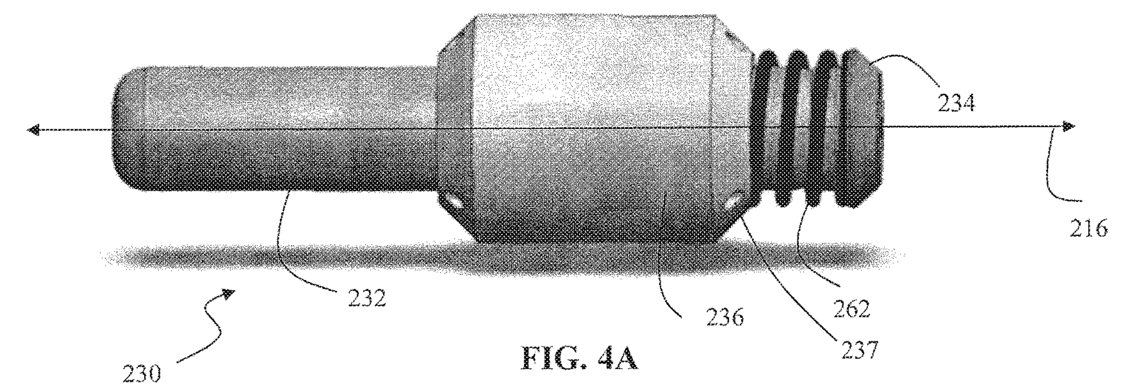
FIGS. 4A and 4B show various views of another exemplary composite electrode of the present invention.
Figure 4B:
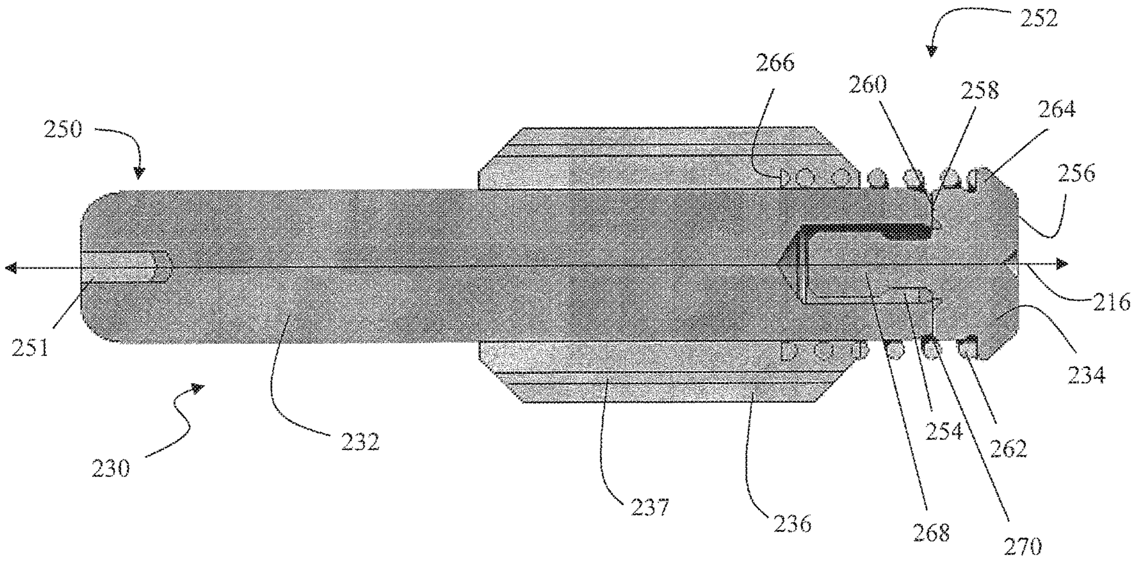

FIGS. 4A and 4B show various views of another exemplary electrode 230, which includes a forward portion 232, a contact element 234, an aft portion 236 and a resilient element 262. The electrode 230 can function similarly as the spring-forward electrode for a contact start plasma arc torch described in U.S. Pat. No. 8,115,136 and assigned to Hypertherm, Inc. of Hanover, N.H., the disclosure of which is hereby incorporated herein by reference. The forward portion 232 of the electrode 230 includes a proximal end 250 for housing an emissive element 251 and a distal end 252. During torch operation, the proximal end 250 is positioned near the workpiece (not shown) and the distal end 252 is positioned remotely from the workpiece. At least a portion of the electrode 230 is movable along the longitudinal axis 216 when the electrode 230 is mounted within a plasma arc torch, such as the torch 10 of FIG. 1.

The resilient element 262 is configured to bias the forward portion 232 and the aft portion 236 away from the contact element 234 and toward the nozzle 24 of the torch 10. The resilient element 262 can be electrically conductive for passing substantially all of a pilot arc current between a power supply (not shown) and the forward portion 232 during pilot arc operation. The resilient element 262 can also pass at least a portion of a transferred arc current between the power supply and the forward portion 232 during transferred arc operation. The resilient element 262, which is depicted as a helical spring, is restrained between a radially extending flange 264 (e.g., a shoulder) of the contact element 234 and a restraining surface 266 of the aft portion 236 while maintaining physical contact with a surface 270 of the forward portion 232. Such physical contact provides a current path from the flange 264 to the forward portion 232 via the resilient element 262. In some embodiments, the resilient element 262 is secured to the flange 264 and/or the restraining surface 266 such that the resilient element 262 is retained to the electrode 230. The resilient element 262 can be retained by a diametral interference fit or other type of friction fit. The resilient element 262 can be secured to the electrode 230 to hinder disengagement during processing or maintenance operations.

The contact element 234 of the electrode 230 includes a first surface 256 and a second surface 258. The first surface 256 is configured for electrical communication with a power supply (not shown), which can provide electrical current to the contact element 234. The second surface 258 is configured for electrical communication with a corresponding contact surface 260 of the forward portion 232 after initiation of the pilot arc and during transferred arc mode. In some embodiments, the contact element 234 is substantially stationary when the electrode 230 is mounted within the torch 100 while the forward portion 232 and/or the aft portion 236 moves relative to the contact element 234 as controlled by the resilient element 262.

As depicted, the forward portion 232 includes a receptacle 254 disposed at the distal end 252 for receiving an axially extensive member 268 of the contact element 234. The receptacle 254 can be substantially aligned with the longitudinal axis 216. The axially extensive member 268 extends from the second surface 258 and can slideably engage the inner surface of the receptacle 254. In some embodiments, the engagement between the axially extensive member 268 of the contact element 234 and the inner surface of the forward portion 232 restrains radial motion of the forward portion 232 or the contact element 234 within the torch 10.

The aft portion 236 is a ring-shaped structure with a hollow center that fits axially around an exterior surface of the forward portion 232. The aft portion 236 can be situated at the distal end 252 of the forward portion 232. The aft portion 236 can include a pneumatic reaction region for receiving a biasing flow of a pressurized gas. For example, the aft portion 236 can include one or more fluid passageways 237 allowing the passage of a pneumatic and cooling gas through the aft portion 236 to facilitate cooling. The restraining surface 266 of the aft portion 236 is adapted to physically contact one end of the resilient element 262. The aft portion 236 can be substantially attached to the forward portion 232 such that the two portions move as one piece. Therefore, when the resilient element 262 exerts a force on the restraining surface 266 of the aft portion 236 toward the proximal end 250, such force is also experienced by the forward portion 232.

The electrode 230 can be assembled into the torch 10 of FIG. 1 in place of the electrode 20. The first surface 256 of the contact element 234 is configured for electrical communication with a power supply. The contact element 234 can be relatively stationary within the torch 10. The resilient element 262 urges the aft portion 236 to separate from the power supply and the contact element 234. Because the aft portion 236 is attached to the forward portion 232, the forward portion 232 is also pushed away and separated from the power supply and the contact element 234 and into physical contact with the nozzle 24. In such a configuration, the second surface 258 of the contact element 234 is distant from contact surface 260 of the forward portion 232.

Pilot arc operation begins with initiation of a pilot arc. A pilot arc current is passed from the power supply to the contact element 234 via the first surface 256 of the contact element 234. The pilot current then passes from the contact element 234 to the resilient element 262 via the flange 264 of the contact element 234. The current subsequently passes from the resilient element 262 to the forward portion 232 at the physical interface 270 between the two components. The current is then passed from the forward portion 232 to the nozzle 24. Gas enters the torch 10 to the plasma chamber 30. Gas pressure in the plasma chamber 30 builds until the pressure is sufficient to overcome the biasing force provided by the resilient element 262 and moves the forward portion 232 away from the nozzle 24, thereby creating a space or gap between the forward portion 232 and the nozzle 24. The forward portion 232 moves with respect to the torch 10 substantially along the longitudinal axis 216. In some embodiments, the contact element 234 aligns the forward portion 232 by restraining its radial motion both during pilot arc operation and during transferred arc mode. In some embodiments, as the forward portion 232 moves away from the nozzle 24, the aft portion 236 that is coupled to the forward portion 232 begins to compress the resilient element 262 against the contact element 234 at the flange 264. As the forward portion 232 moves away from the nozzle 24, a relative electric potential develops in the gap between the forward portion 232 and the nozzle 24, which causes an arc to be generated in the gap. The arc ionizes the gas in the plasma chamber 30 to form the plasma jet used in workpiece processing.

The forward portion 232 moves along the longitudinal axis 216 until the contact surface 260 of the forward portion 232 contacts the second surface 258 of the contact element 234. This position can be referred to as the "blown-back" configuration because the forward portion 232 has been separated from the nozzle 24. In addition, the first surface 256 of the contact element 234 maintains electrical communication with the power supply and the contact element 234 is relatively stationary with respect to the forward portion 232. In some embodiments, the resilient element 262 carries electrical current in the blown-back configuration.

In the blown-back configuration, the arc is transferred from the nozzle 24 to the workpiece for workpiece processing by positioning the torch 10 near the workpiece. The workpiece is maintained at a relatively lower electric potential than the nozzle 24. An electrical lead (not shown) in communication with the workpiece can provide a signal to the power supply (not shown) based on the transfer of the arc to the workpiece. When the torch is in the blown-back configuration, the power supply provides an increased electrical current (e.g., a cutting current) to the torch 10. One example of a method for increasing the electrical current to the torch is known as "dual-threshold" and is described in U.S. Pat. No. 6,133,543 and assigned to Hypertherm, Inc. of Hanover, N.H., the disclosure of which is hereby incorporated herein by reference. This mode of operation, including the arc being transferred to the workpiece, is referred to as transferred arc mode. When the torch 10 is in the blown-back configuration, the power supply provides electrical current to the contact element 234, and to the forward portion 232. The electrical current can be passed from the contact element 234 to the forward portion 232 via 1) the interface between the contact surface 260 and the second surface 258 and/or ii) the resilient element 262 that physically contacts middle portion at the flange 264 and the forward portion 232 at the surface 270.

The forward and aft portions and the contact element of the composite electrode 230 can be made from various combinations of materials. The forward portion 232 of the electrode 230 is exposed to the most amount of heat during torch operation due to its location near the tip of a plasma arc torch 10. Therefore, the forward portion 232 can be constructed from a more thermally conductive, denser material than other portions of the electrode 230. In some embodiments, the forward portion 232 is constructed from a similar material as the forward portion 202 of the composite electrode 200 of FIG. 2, such as copper. The contact element 234 can be constructed from a material with less density and/or less conductivity than that of the material of the forward portion 232. For example, the contact element 234 can be made of aluminum and the forward portion 232 can be made of copper. In some embodiments, the contact element 234 can be constructed from the same or a similar material as the middle portion 204 of the electrode 200. The aft portion 236 can be constructed from a material that is different from the material of the forward portion 232 and/or the material of the contact element 234. For example, the material of the aft portion 236 can have a density that is less than that of the forward portion 232 and/or the contact element 234. In some embodiments, the aft portion 236 is constructed from the same or a similar material as the aft portion 206 of the electrode 200, such as plastic. In some embodiments, the aft portion 236 is constructed from a material with less density and/or less conductivity than that of the material of the forward portion 232. For example, the aft portion 236 can be made of aluminum while the forward portion 232 can be made of copper. In one exemplary configuration, the forward portion 232 and the contact element 234 are made of copper while the aft portion 236 is made of aluminum. In another exemplary configuration, the forward portion 232 is made of copper while the contact element 234 and the aft portion 236 are made of aluminum.

Figure 5A:
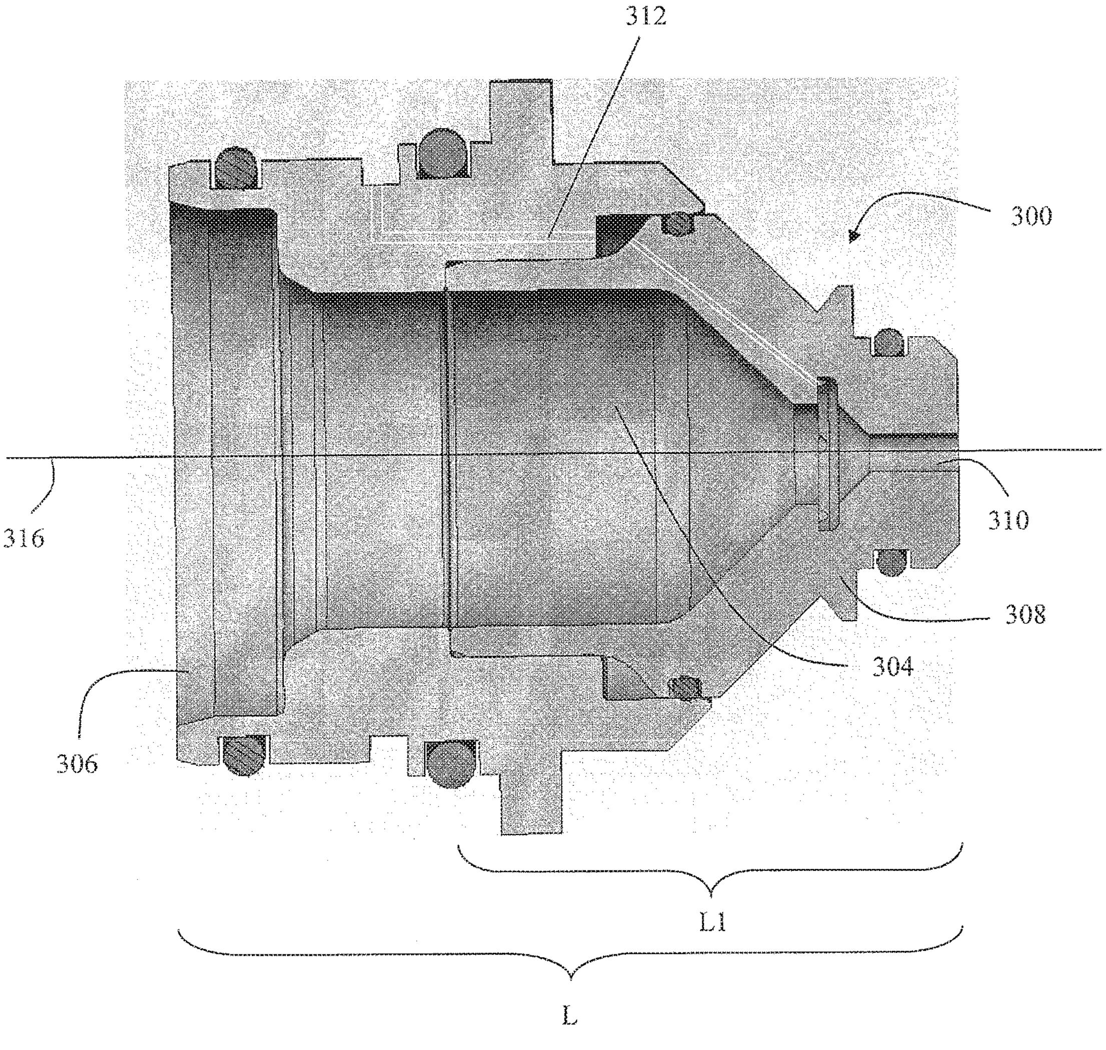
FIGS. 5A and 5B show various views of an exemplary composite nozzle of the present invention.
Figure 5B:
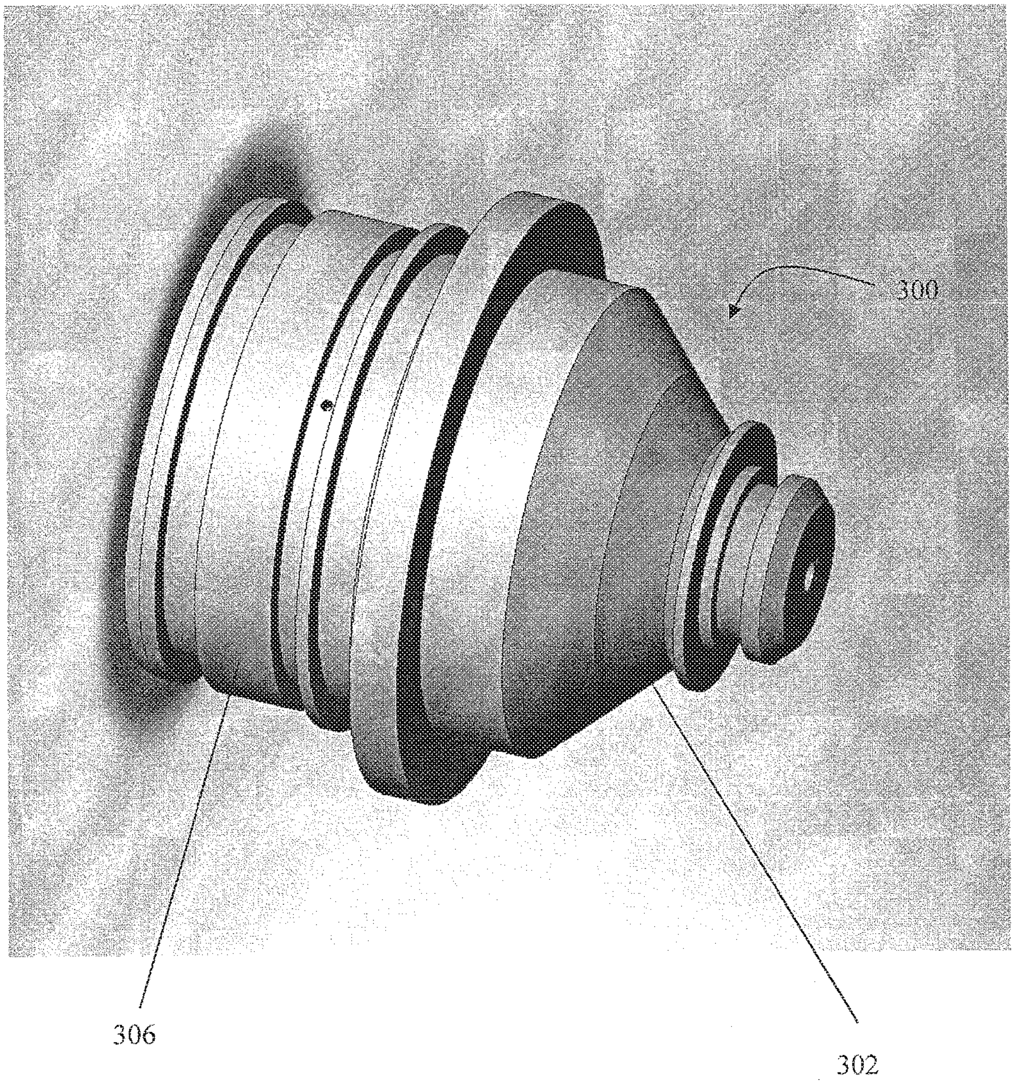

In addition to the composite electrodes 200 and 230, other consumables of a plasma arc torch can also be manufactured as a composite of two or more materials. FIGS. 5A and 5B show various views of an exemplary composite nozzle 300. FIG. 5A shows a cross-sectional view of the composite nozzle 300 constructed as a combination of an aft portion 306 and a forward portion 308. The forward portion 308 includes a tip section 302 and a rear section 304. The tip section 302, as illustrated in an exterior view of the composite nozzle 300 in FIG. 5B, includes an exposed, outside region of the nozzle 300 and forms a nozzle tip. A plasma exit orifice 310 is disposed in the tip section 302 for introducing a plasma arc to a workpiece. The rear section 304 of the forward portion 308 includes an interior region of the nozzle. In some embodiments, a mating surface of the rear section 304 and a corresponding mating surface of the aft portion 306 are in direct contact with each other and form a hermetic seal, thereby coupling the forward portion 308 to the aft portion 306. As shown, the forward portion 308 and the aft portion 306 are substantially hollow, thus forming a substantially hollow interior in the nozzle 300.

The forward portion 308 of the nozzle 300 is exposed to the most amount of heat during torch operation due to its location near the tip of a plasma arc torch. Therefore, the forward portion 308 is generally constructed from a more thermally conductive, denser material than other sections of the nozzle 300. In some embodiments, the forward portion 308 is constructed from a similar material as the forward portion 202 of the composite electrode 200 of FIG. 2, such as copper. The aft portion 306 of the nozzle 300 can be constructed from a material with less density and/or less conductivity than that of the material of the forward portion 308. For example, the aft portion 306 can be made of aluminum and the forward portion 308 can be made of copper. In some embodiments, the aft portion 306 can be constructed from the same or a similar material as the middle portion 204 of the electrode 200. In some cases, only the tip section 302 of the forward portion 308 of the nozzle 300 is made from a material of higher density and/or higher conductivity in comparison to the remaining sections of the nozzle 300. The rear section 304 of the forward portion 308 can be made of a material same as that of the tip section 302 of the forward portion 308 or same as that of the aft portion 306. In some embodiments, the rear section 304 is made of a material different from the tip section 302 and the aft portion 306. For example, the tip section 302 can have the highest material density, followed by the rear section 304 and then the aft portion 306.

The nozzle 300 can include a third, external portion (not shown). In some embodiments, the third portion substantially overlays an exterior surface of the aft portion 306 and/or the tip section 302 of the forward portion 308. That is, the third portion can form an outer shell of the nozzle 300. In some embodiments, the third portion is made of a material different from the materials of the forward portion 308 and/or the aft portion 306. The third portion can include an anodized layer of material to provide electrical insulation or corrosion resistance. For example, directing a coolant onto an aluminum portion of a consumable can cause corrosion of the aluminum, which in turn damages coolant pumps in the plasma system. The addition of the third portion onto the area of liquid contact can prevent such corrosion. The third portion can also be added to prevent electrical contact with adjacent components. Thus, the third portion can be made from a non-conductive, less dense material, such as plastic. In some embodiments, the third portion is made of the same material as the aft portion 306 or the forward portion 308.

The composite nozzle 300 can be cooled by a cooling liquid or air. In some embodiments, a coolant flows through at least one coolant tube that cools the aft portion 306 of the nozzle 300 by contacting at least a portion of the surface of the aft portion 306. In some embodiments, the forward portion 308 of the nozzle 300 includes a liquid-cooled region such that heat transfer from the plasma exit orifice 310 is cooled directly by a coolant without transferring heat across the boundary between the forward portion 308 and the aft portion 306.

The nozzle 300 can also include one or more venting channels embedded in the forward portion 308 and/or the aft portion 306. For example, as shown in FIG. 5A, the venting channel 312 is configured to lead a portion of the plasma gas in the tip section 302 away from the plasma chamber, traversing along the forward portion 302 and/or the aft portion 306, and out from the aft portion 306, in accordance with the teachings of U.S. Pat. No. 5,317,126, which is assigned to Hypertherm, Inc. of Hanover, N.H., the disclosure of which is hereby incorporated herein by reference.

In some embodiments, the nozzle 300, including at least one of the forward portion 308 or the aft portion 306, is elongated to access difficult-to-access locations. As shown in FIG. 5A, the nozzle 300 has a length L along a longitudinal axis 316 that extends through the nozzle body. In some embodiments, the length of the forward portion $L_1$ along the longitudinal axis 316 is about 25% of the overall length L of the nozzle. Alternatively, the length of the forward portion $L_1$ comprises about 20%, 30%, 40% or 50% of the overall length L of the nozzle 300.

Figure 6:
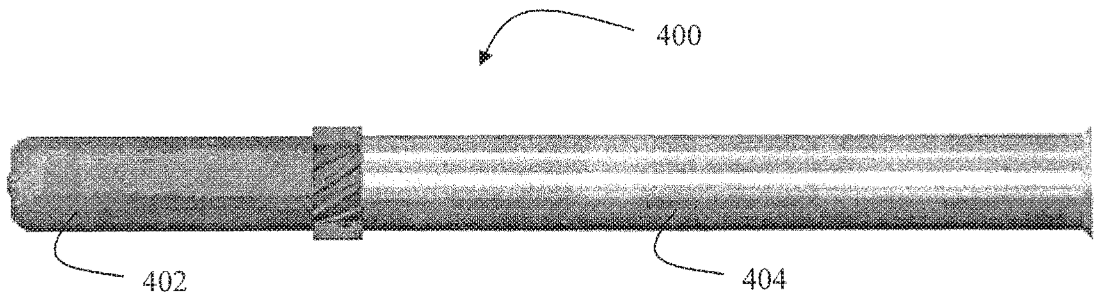
FIG. 6 shows an exemplary composite retaining cap of the present invention.

FIG. 6 shows an exemplary composite, extended-length retaining nozzle 400 constructed as a combination of a forward portion 402 and an aft portion 404. The nozzle 400 can be installed for operation in the plasma arc torch 10 in place of nozzle 24. The forward portion 402 can be manufactured from a similar material as the forward portion 202 of the composite electrode 200 of FIGS. 2A and 2B. The aft portion 404 can be manufactured from a similar material as the middle portion 204 and/or the aft portion 206 of the electrode 200. The forward portion 402 of the nozzle 400 is exposed to the most amount of heat during torch operation due to its location near the tip of the plasma arc torch. Therefore, the forward portion 402 is generally constructed from a more conductive, denser material than the aft portion 404. In some embodiments, the nozzle 400 includes a third, middle portion (not shown) that is constructed from a material less conductive and/or less dense than the forward portion 402. In some embodiments, the nozzle 400, including at least one of the forward portion 402 or the aft portion 402, is elongated.

In yet another aspect, a composite shield, such as the shield 32 of the plasma arc torch 10, can be constructed as a combination of two or more portions, with at least one portion having a different material density than the remaining portions. For example, the portion closest to the plasma arc, which is most exposed to heat during torch operation, can be constructed from a material with higher density and/or higher conductivity than other portions.

It should also be understood that various aspects and embodiments of the invention can be combined in various ways. Based on the teachings of this specification, a person of ordinary skill in the art can readily determine how to combine these various embodiments. For example, the joining methods, the approaches for selecting materials with different properties, the cooling techniques, and the manufacturing methods described above with respect to the composite electrode 200 are also applicable to the composite electrode 230, the composite nozzle 300, the composite nozzle 400 and a composite shield. In addition, modifications may occur to those skilled in the art upon reading the specification. The present application includes such modifications and is limited only by the scope of the claims.

What is claimed is:

1. An electrode for use in a plasma arc torch, the electrode comprising:

an elongated forward portion, defining a proximal end and a distal end, configured to provide an electrically conductive path from the distal end to the proximal end, the forward portion comprising a first conductive material with a first density;

a ring-shaped aft portion, defining a hollow center, configured to substantially surround and attach to a portion of the forward portion, a portion of the forward portion being located inside of the hollow center, the aft portion comprising a second conductive material with a second density, wherein the second density is at least two times less than the density of the first material;

an emitter disposed in the proximal end of the forward portion;

a contact element located at the distal end of the forward portion; and a resilient element located between the contact element and the ring-shaped aft portion and physically contacting the forward portion, the ring-shaped aft portion coupling to the forward portion and adapted to move as one piece with the forward portion, the resilient element biasing the ring-shaped aft portion and the forward portion away from the contact element, wherein the resilient element passes at least a portion of a transferred arc current between a power supply and the forward portion via the contact element during a transferred arc operation of the plasma arc torch.

2. The electrode of claim 1, wherein the ring-shaped aft portion includes a pneumatic reaction region for receiving a biasing flow of a pressurized gas.

3. The electrode of claim 1, wherein the ring-shaped aft portion includes at least one fluid passageway for allowing passage of a gas therethrough.

4. The electrode of claim 1, wherein the contact element comprises a third material.

5. The electrode of claim 1, wherein the resilient element passes at least a portion of a pilot arc current between a power supply and the forward portion via the contact element during a pilot arc operation of the plasma arc torch.

6. The electrode of claim 1, wherein the first conductive material comprises copper and the second conductive material comprises aluminum.

7. A plasma arc torch comprising:

an electrode comprising at least a forward portion, an aft portion, a contact element and a resilient element, wherein:

the forward portion including an electrode tip comprising a conductive first material, the electrode tip including: 1) a pilot contact region for initiating a pilot arc and 2) an emitter;

the aft portion, configured to attach to the forward portion, comprising a second material, the material density of the second material being at least half of the material density of the first material;

the contact element located at a distal end of the forward portion; and the resilient element located between the contact element and the aft portion and physically contacting the forward portion, the aft portion coupling to the forward portion and adapted to move as one piece with the forward portion, the resilient element biasing the aft portion and the forward portion away from the contact element, wherein the resilient element passes at least a portion of a transferred arc current between a power supply and the forward portion via the contact element during a transferred arc operation of the plasma arc torch; and a nozzle mounted relative to the electrode, the nozzle and the electrode defining a plasma chamber.

8. The plasma arc torch of claim 7, wherein the electrode tip is cooled by a plasma flow through the plasma chamber.

9. The plasma arc torch of claim 7, wherein the electrode further comprises a third portion coupled to a distal end of the aft portion, the third portion including a pneumatic reaction region for receiving a plasma flow.

10. The plasma arc torch of claim 7, wherein the nozzle comprises at least a tip portion and a body portion, the tip portion comprising the conductive first material and the body portion comprising the second material.

11. A method of manufacturing an electrode usable in a plasma arc torch, the method comprising:

selecting a first conductive material having a first density and a second conductive material having a second density, wherein the second density is at least two times greater than the density of first material;

forming a ring-shaped aft portion from the first conductive material, the ring-shaped aft portion defining a hollow center;

forming an elongated forward portion from the second conductive material, the elongated forward portion defining a proximal end and a distal end;

fitting the elongated forward portion through the hollow center of the ring-shaped aft portion such that the ring-shaped aft portion substantially surrounds and attach to at least a portion of the forward portion;

locating an emitter in the proximal end of the forward portion;

locating a contact element at the distal end of the forward portion; and locating a resilient element between the contact element and the ring-shaped aft portion, the resilient element physically contacting the forward portion, the ring-shaped aft portion coupling to the forward portion and adapted to move as one piece with the forward portion such that the resilient element biases the ring-shaped aft portion and the forward portion away from the contact element, wherein the resilient element passes at least a portion of a transferred arc current between a power supply and the forward portion via the contact element during a transferred arc operation of the plasma arc torch.

* * * * *